United States Patent [19]

Schmitt-Raiser et al.

[11] Patent Number: 5,042,570
[45] Date of Patent: Aug. 27, 1991

[54] CEILING CONSTRUCTION HAVING MAGNETIC ATTACHMENT BETWEEN HEAT EXCHANGER ELEMENTS AND CEILING TILES

[75] Inventors: Karl A. Schmitt-Raiser, Wetzlar; Fritz Nüssle, Weil der Stadt, both of Fed. Rep. of Germany

[73] Assignees: Wilhelmi Werke GmbH & Co. KG, Lahnau, Fed. Rep. of Germany; Flaekt AB, Stockholm, Sweden

[21] Appl. No.: 544,733

[22] Filed: Jun. 27, 1990

[30] Foreign Application Priority Data

Jul. 1, 1989 [DE] Fed. Rep. of Germany ....... 3921719

[51] Int. Cl.$^5$ .......................... F24D 19/02; F24H 9/06
[52] U.S. Cl. ......................... 165/56; 165/49; 165/53; 165/76; 165/171; 165/185; 237/69
[58] Field of Search ........... 165/49, 53, 56, 76, 165/171, 185; 237/69

[56] References Cited

U.S. PATENT DOCUMENTS

| | | | |
|---|---|---|---|
| 2,221,001 | 11/1940 | Lucius | 165/57 |
| 2,486,563 | 11/1949 | Jorgensen | 165/53 |
| 2,800,308 | 7/1957 | Parkinson et al. | 165/56 |
| 3,043,567 | 7/1962 | Bergh et al. | 165/56 |
| 3,049,341 | 8/1962 | Kemp | 165/56 |
| 3,323,582 | 6/1967 | Armstrong | 165/56 |
| 3,366,170 | 1/1968 | Welz | 165/53 |
| 4,195,417 | 4/1980 | Mathews | 165/76 |
| 4,360,141 | 11/1982 | Kensrue | 165/76 |
| 4,486,962 | 12/1984 | Wedel | 165/76 |
| 4,941,528 | 7/1990 | Herbst | 165/56 |

FOREIGN PATENT DOCUMENTS

| 1231403 | 12/1966 | Fed. Rep. of Germany | 165/76 |
|---|---|---|---|
| 0198690 | 11/1983 | Japan | 165/76 |

Primary Examiner—John Ford
Attorney, Agent, or Firm—Flynn, Thiel, Boutell & Tanis

[57] ABSTRACT

A ceiling construction comprising a frame built out of longitudinal girders 1 and cross girders 2 connected to the longitudinal girders. Tiles 3 are suspended in fields defined by the frames. Heat-exchanger elements 4 are arranged above the tiles 3. In order to assure that an as good as possible heat transfer between the heat-exchanger elements 4 and the tiles 3 is guaranteed, the tiles are mounted according to the invention on the heat-exchanger elements by means of holding magnets 8.

15 Claims, 3 Drawing Sheets

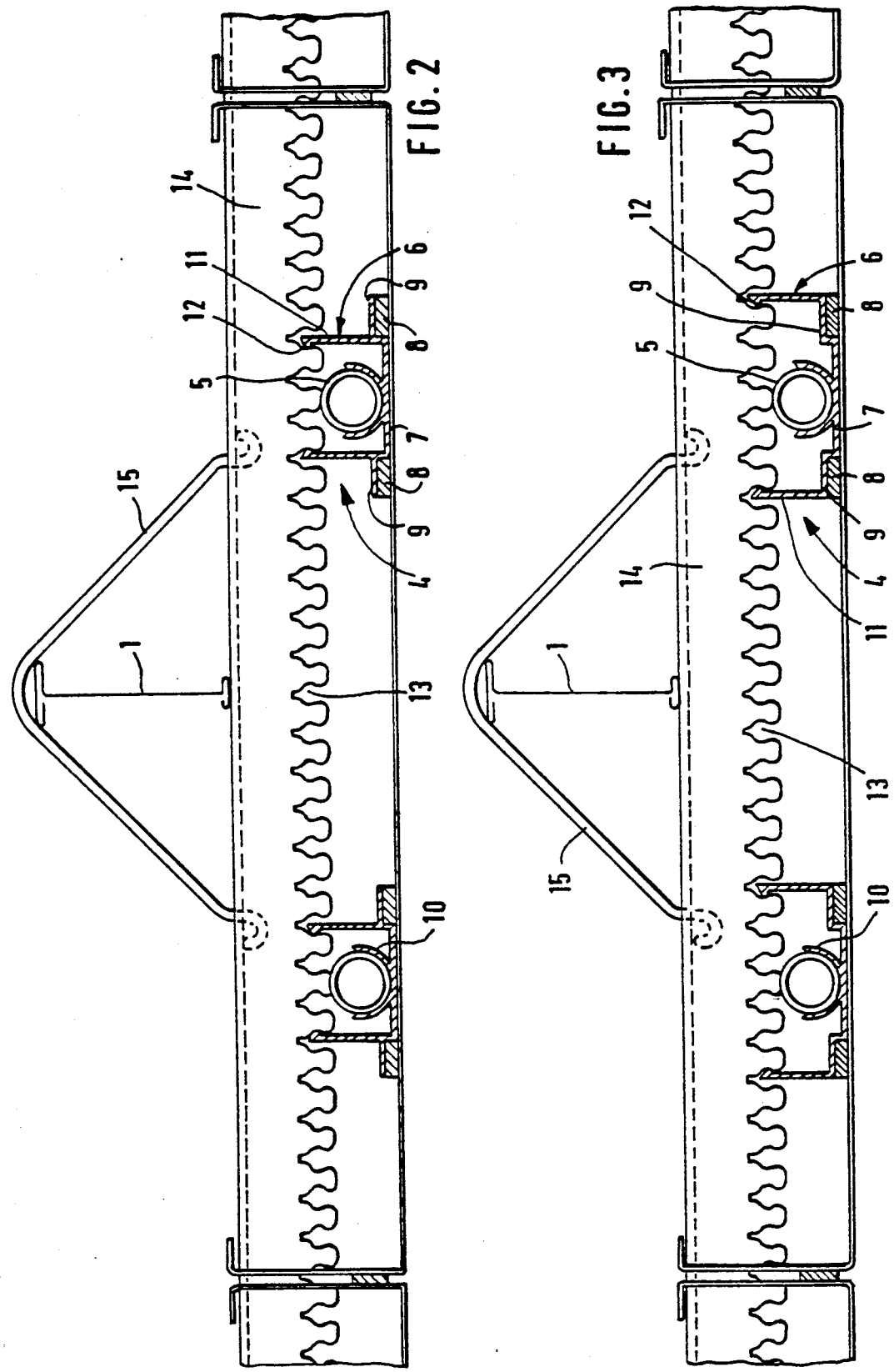

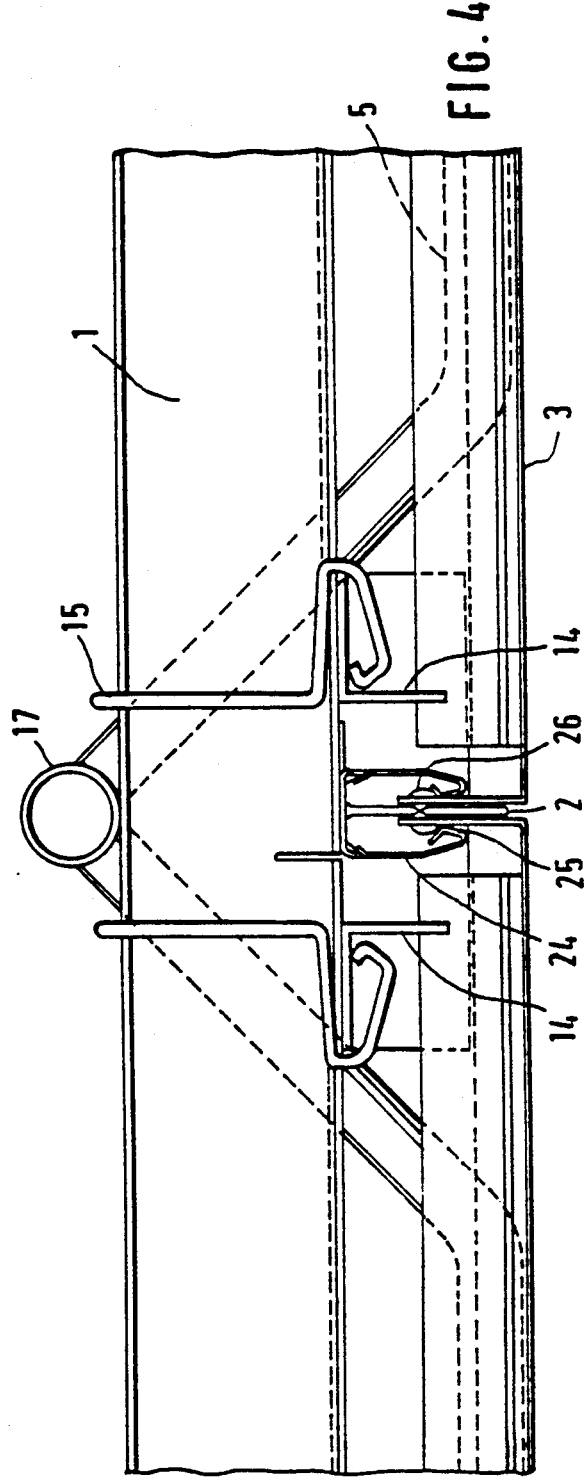
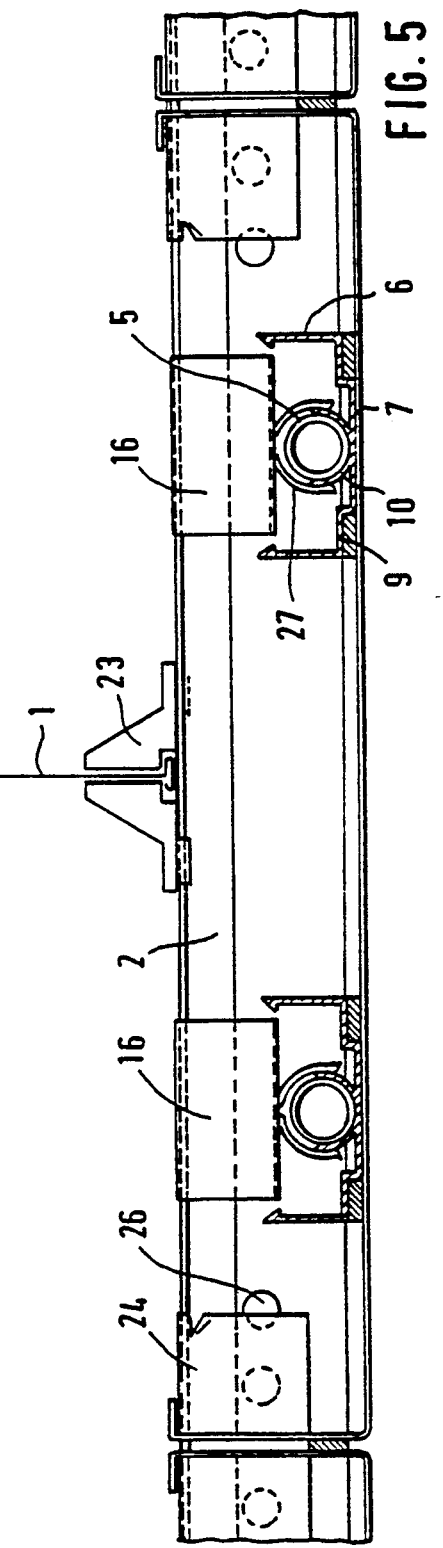

CEILING CONSTRUCTION HAVING MAGNETIC ATTACHMENT BETWEEN HEAT EXCHANGER ELEMENTS AND CEILING TILES

FIELD OF THE INVENTION

The invention relates to a ceiling construction comprising a frame built of longitudinal girders and cross girders connected to the longitudinal girders, comprising tiles suspended in the fields of the frame, and comprising heat-exchanger elements arranged above the tiles.

BACKGROUND OF THE INVENTION

Ceiling constructions or rather suspended ceilings with heat-exchanger elements are known from the state of the art. The ceiling constructions are used to discharge heat from the respective room, with the contact surfaces of the ceiling-construction elements themselves functioning as cooling surfaces so that additional heat-exchanger elements, which would have to be brought into room separately, are not needed. The advantage of such ceiling constructions is that, on the one hand, they can be designed optically so that they do not interfere with the total impression of the room and that, on the other hand, a free utilization of the room is not limited. Thus it is, for example, possible to place room dividers or similar items into the room without having to make changes in the construction of the ceiling.

The problem occurring in known ceiling constructions is that the heat-exchanger elements, which are arranged above the ceiling tiles, must contact the tiles in such a manner that an as good as possible heat transfer takes place betwen the tiles and the heat-exchanger elements. It is thereby particularly necessary for the heat-exchanger elements to be in direct contact with the tiles since air gaps would result in an insulation and thus in an interruption of the heat transfer.

Known constructions had to use a thick-wall material in order to produce sufficient contact pressure for a good heat conduction. This thick-wall material cannot exceed, due to its manufacture, a certain dimension in the width of the visible panels. In addition, grooved joints were necessary between the visible profiles arranged in the panel structure to assure a sufficient sound-absorption action and a good demountability.

The basic purpose of the invention is to provide inexpensive, thin-wall ceiling tiles of a steel plate in almost any desired format which, with respect to their surface treatment, meet high acoustical and light-technical demands and can thereby be laid almost jointless.

The purpose is attained according to the invention by the heat-exchanger elements being mounted on the tiles by means of a magnetic force. The special installation technique enables an easy removal of the ceiling tiles without necessitating the cooling system to also be demounted.

The ceiling construction of the invention has a number of significant advantages. Since a mounting of the heat-exchanger elements on the tiles or vice versa is done by means of a magnetic force, on the one hand, a flat and good bearing of the tiles on the heat-exchanger elements is always assured, on the other hand, the tiles can be installed or removed in a particularly simple manner since no further connecting devices need to be released or connected between the heat-exchanger elements and the tiles. Rather during the installation of the tiles themselves there takes place an automatic abutment of the tiles on the heat-exchanger elements, so that a heat transfer through conduction can occur substantially undisturbed.

A further, important advantage of the ceiling construction of the invention is that no additional controlling operations are needed during the installation in order to check whether the heat-exchanger elements are sufficiently fixed on the tiles. Rather an automatic association occurs. All of this lowers the necessary installation operations to a minimum, since besides the fastening of the tiles themselves no further operations are necessary.

A particularly favorable development of the invention provides that the tiles are manufactured of a thin sheet-metal material. Thus, it is possible according to the invention to significantly reduce the weight of the individual tiles and at the same time to secure a sufficient heat transfer to the heat-exchanger elements. The particular advantage of the development of the invention is that the deformations occurring with very thin tiles do not have any effect on the heat-transfer processes since the magnetic force pulls the tiles to the heat-exchanger elements. In addition, what happens here is that the tiles are stabilized in their shape by the heat-exchanger elements so that, in particular in the case of large-surface tiles, bends or the like need not to be feared.

Thin perforated tiles having a porous coating on their visible side are advantageously used, which tiles have excellent acoustical characteristics. Compared with the state of the art, an effective cooling ceiling with a low weight and a high sound absorption is hereby obtained.

The heat-exchanger element is advantageously constructed according to the invention such that it includes a pipe and a profiled rail supported on its lower area, which profiled rail has a substantially flat bottom surface. The heat-exchanger element is thus designed substantially in two parts and permits an adjustment of the profiled rail in its design and dimensions in an optimum manner to the respective requirements, while at the same time the pipe itself can be constructed substantially as desired, in particular also regarding the material selection, which in particular, in view of corrosion phenomena and sealing problems, is of a significant importance on the case of the respectively used cooling medium.

To produce the magnetic force, the invention provides that holding magnets are arranged at the lower area of the profiled rail. These can be provided in the form of individual magnets, however, it is also possible to design the holding magnets in the form of a strip and to arrange these over the entire length of the profiled rail.

The profiled rail is in a particularly advantageous embodiment of the invention provided with laterally extending flanges which are set back with respect to the bottom surface and on which the holding magnets are arranged. This embodiment assures, on the one hand, that the holding magnets can be fastened in a suitable manner to the profiled rail and that, on the other hand, the substantially flat bottom surface of the profiled rail can be placed completely against the respective surface of the tile. The thickness of the magnets is of course determined in a suitable manner. The heat flow from the tiles thus takes place directly into the material of the profiled rail so that the holding magnets are of no importance with respect to the heat conduction. From this results the advantage that through a suitable material selection for the profiled rail, good heat-conducting characteristics can be achieved, while the material of the holding magnets is determined only in view of the necessary holding force.

In order to fasten or support, according to the invention, the pipe in a safe manner on the profiled rail and to provide thereby a good heat transfer and also good mechanical strength factors, it is provided that the profiled rail has a substantially U-shaped cross section and is provided with a partially cylindrical area to receive the pipe. The U-shaped cross section forms, on the one hand, the substantially flat bottom surface which rests on the ceiling construction tile and, on the other hand, the U-cross section assures a sufficient mechanical strength and torsion resistance of the profiled rail. In addition, it is possible as will be described hereinafter to use the free legs of the U-profile to support or fasten the profiled rail. Whereas the partially cylindrical area is used to receive the pipe and makes it possible to at least partially form-lockingly grip around the pipe in order to assure also between the pipe and the profiled rail a heat transfer without any problems.

Alternatively to the described embodiment, it is of course also possible to construct the profiled rail in one piece with the pipe in order to be able to avoid in this manner further heat-transfer areas and contact surfaces.

The free legs of the profiled rail can be provided at their free ends with thickened areas, which can be form-lockingly held in recesses of the cross girders. Additional fastening elements to support the profiled rails are thus not necessary. Depending on the respective design of the ceiling construction, it is of course also possible to support the profiled rails on the longitudinal girders or other support elements.

To enable a substantially standardized design of the ceiling construction, the invention can furthermore provide that the profiled rails are not suspended directly on the cross girders but on racklike support rails arranged parallel to the cross girders. This design has the advantage that the profile of the cross girders must not be changed so that these can also be used in standardized ceiling constructions not provided with a cooling system. The additional support rails can be connected in a simple manner to the cross girders by means of screws or plug connections or through other connecting elements.

A particularly advantageous embodiment of the invention provides that the support rail is held on the longitudinal girders by means of spring bars. A direct fastening on the cross girders is not needed in this embodiment so that the cross girders are not weakened by additional bores or the like. Furthermore, this embodiment permits the subsequent mounting of the support rails or rather of the heat-exchanger elements on already exisiting subconstructions.

Alternatively to the fastening of the profiled rails on the cross girders or rather the support rails, it is also possible to support the profiled rails by means of mounting elements, which grip around the cross girders on the cross girders. The mounting elements are thereby preferably designed such that these grip around the partially cylindrical area of the profiled rail or can be anchored on the area. However, it is also possible to lock the mounting elements on the free legs of the profiled rail.

The inflow or outflow of the cooling medium to or rather from the pipes of the heat-exchanger elements is done advantageously by arranging connecting pipes above the cross girders, from which connecting pipes branch off the pipes of the heat-exchanger elements. This embodiment simplifies the entire design of the ceiling construction, since the plurality of individual pipes of the heat-exchanger elements are each connected to a center connecting pipe, which in turn is connected through suitable connecting pieces to the cooling-medium circulating system. Thus, it is possible to premanufacture framelike pipe areas and to move these into a standardized ceiling design. The installation operations are significantly simplified in this manner, since it is only necessary to connect the respective connecting pipes among one another or to connect them to the cooling-medium circulating system, while the individual pipes of the heat-exchanger elements are already prior to the installation connected to the connecting pipes.

Thus, it is possible according to the invention to use very thin tile materials, which are mounted on the heat-exchanger elements in such a manner that the heat transfer between the tiles and the heat-exchanger elements can occur with a high degree of efficiency.

BRIEF DESCRIPTION OF THE DRAWINGS

The invention will be described hereinafter in connection with exemplary embodiments and the drawings, in which:

FIG. 2 is a front view of the edge of the ceiling cover, which edge is the right edge in FIG. 1;

FIG. 3 illustrates a further exemplary embodiment similar to FIG. 2;

FIG. 4 is a side view, in a simplified illustration, of a further edge of the ceiling cover, which edge is the left edge according to FIG. 1; and FIG. 5 is a front view similar to FIGS. 2 and 3 of a further exemplary embodiment.

DETAILED DESCRIPTION

Figure 1:
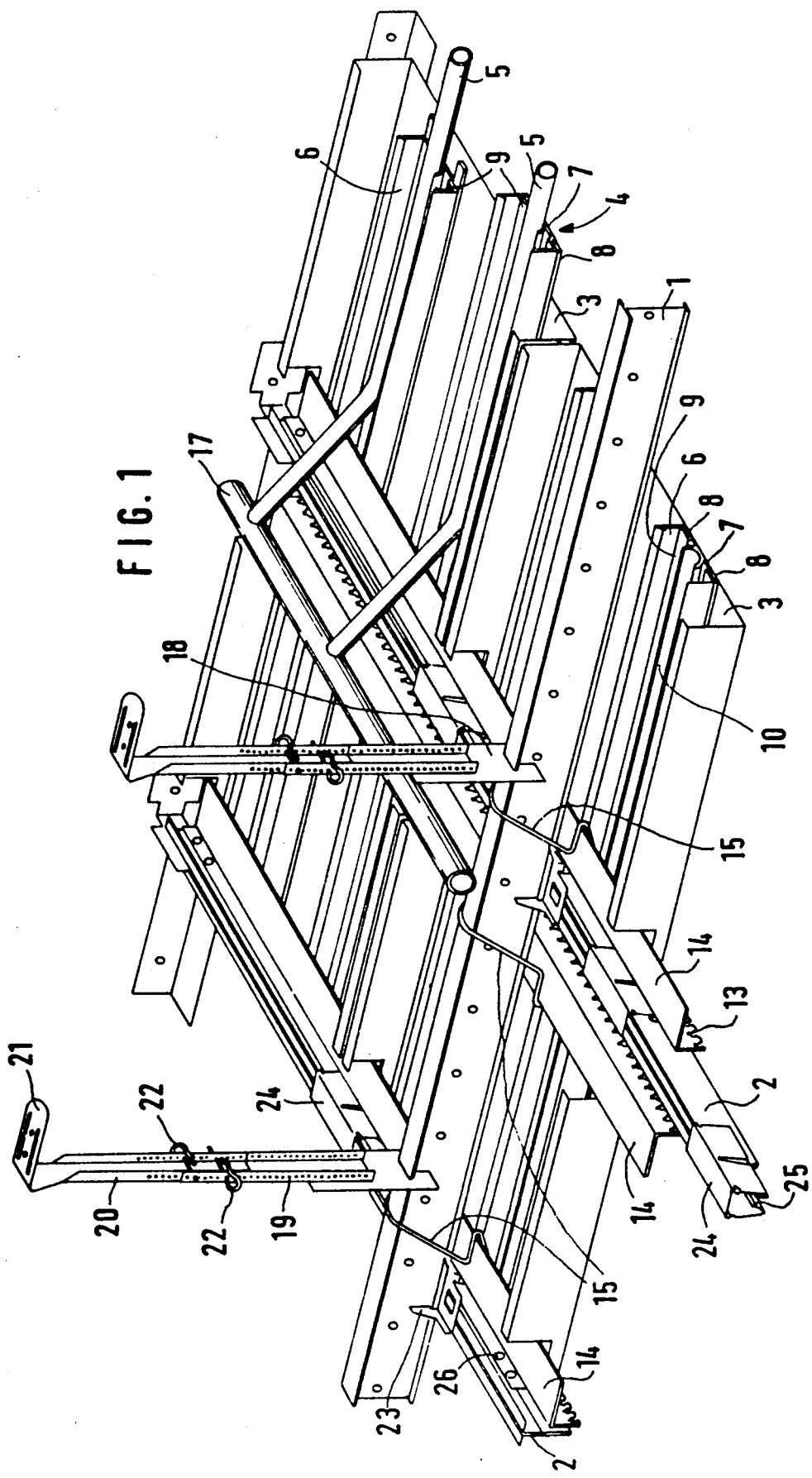
FIG. 1 is a perspective partial top view of an exemplary embodiment of a ceiling construction.

FIG. 1 illustrates in a perspective view a partial area of one exemplary embodiment of a finish-mounted ceiling construction embodying the invention. It includes several longitudinal girders 1 which are parallel to one another and on which cross girders 2 are supported, each at a right angle with respect to the longitudinal girders 1, so that altogether a substantially rectangular frame results and into which tiles 3 can be placed. The tiles 3 are usually designed such that the entire ceiling construction has a substantially flat bottom or downwardly facing surface.

The longitudinal girders 1 are suspended from a ceiling by holding plates 18 in the illustrated exemplary embodiment. The holding plates 18 are suspended form-lockingly in the double-T-shaped cross section of the longitudinal girders 1. Suspension bars 19 are fastened on the holding plates 18, which bars have a U-shaped cross section and are provided on their legs with a plurality of recesses. U-shaped hang-up rods 20 fit into the upper ends of the suspension bars 19. The legs of the hang-up rods 20 have also a plurality of recesses therein. The upper regions of the hang-up rods 20 are bent at a right angle and form fastening plates 21 which are adapted to be screwed to the respective building ceiling. Locking pins 22 are each placed through the legs of the suspension bars 19 and of the hang-up rods 20 in order to enable a longitudinal adjustment of the suspension and to horizontally align the longitudinal girders 1.

The cross girders 2 are fastened to the longitudinal girders 1 by connecting elements 23 which are constructed in the usual manner and each form-lockingly grip around both the longitudinal girder and also the respective cross girder.

In the exemplary embodiment shown in FIG. 1 and also shown in a front view in FIGS. 2 and 3, support rails 14 are each arranged parallel with respect to the cross girders 2. The support rails 14 are anchored or suspended separately and independently from the cross girders 2 on the longitudinal girders 1 by means of spring bars 15. The support rails 14 have a L-shaped cross section and have a plurality of toothlike recesses 13 on the free, downwardly pointing legs.

The tiles 3 have in the illustrated exemplary embodiment each one flat center area, while the free edges are each bent and extend upwardly, with the upper free edge being again bent so that a substantially U-shaped edge area is formed. The tiles 3 are fastened in the usual manner. They are held on the cross girders 2 by means of clamping elements 24. The clamping elements 24 have, as can be seen in FIGS. 1 and 4, also a substantially U-shaped cross section with the free ends of the legs being resiliently designed and having inwardly and upwardly extending projections 25. The projections 25 can be placed form-lockingly against stamped or punched out areas 26 provided on the respective bent legs of the tiles in order to prevent the tiles from becoming disengaged with the frame.

The tiles 3 are, according to the invention, manufactured of a very thin sheet-metal material.

Heat-exchanger elements 4 are, according to the invention, provided above the tiles 3, which elements include a pipe 5 and a profiled rail 6. As shown in FIG. 1, the individual pipes 5 are each connected to a connecting pipe 17 in order to facilitate a cooling medium cycle.

The profiled rail, of which FIGS. 2 and 3 show different exemplary embodiments, includes a substantially flat bottom surface 7, which can be placed flat against the respective tile 3. Holding magnets 8 are furthermore fastened to the profiled rail, which holding magnets 8 are used to pull the tile 3 against the profiled rail 6 and to anchor it to the rail.

The profiled rail 6 is, in the illustrated exemplary embodiments, constructed such that same has a substantially U-shaped profile, with the legs 11 of the U-profile being able to have thickened areas 12 at their free ends. The thickened areas 12 can be moved form-lockingly into the recesses 13 of the cross girders 2 or rather of the support rails 14, as this is illustrated in FIGS. 2 and 3. Furthermore, a partially cylindrical area 10 is arranged inside of the U-profile, in which area the pipe 5 can be received.

The profiled rail has laterally extending flanges 9 to fasten the holding magnets 8, which laterally extending flanges—referred to the bottom surface 7—are set back at the thickness of the holding magnets 8. The laterally extending flanges can, as shown in FIG. 2, be provided either separately or additionally on the U-profile. They can also form a part of the central area of the U-profile (see the exemplary embodiment illustrated in FIG. 3).

FIG. 5 illustrates a further exemplary embodiment of the ceiling construction of the invention, in which the profiled rails 6 are not supported by means of a support rail 14 but through mounting elements 16 which grip over the respective cross girder 2 and have a partially cylindrical clamping structure 27 at their lower ends, which clamping structure can be clamped onto the partially cylindrical area 10 of the profiled rail 6 in order to hold the rail.

FIG. 4 shows a side view of an edge of the ceiling construction, which edge is the lower left edge illustrated in FIG. 1 from which the design of the spring bar 15 for holding the support rail 14 can again be seen. This figure shows furthermore again the design of the clamping elements 24 and their projections 25 for mounting the tiles 3.

It is possible in the illustrated exemplary embodiment to lock the respective pipes 5 later to the profiled rails 6 in such a manner that the pipes are bent upwardly in their connection area, as shown in FIG. 4, in order to enable a connection to the connecting pipe 17. It is thereby possible to prefabricate the pipes 5 and the connecting pipes 17 in this manner and to insert them merely into the ceiling construction at the building site.

A detailed illustration and description of the design of the tiles 3 is not necessary since these are designed in the usual manner.

The invention is not to be limited to the illustrated exemplary embodiments, rather many possibilities for modifications exist within the scope of the invention for the man skilled in the art.

The embodiments of the invention in which an exclusive property or privilege is claimed are defined as follows:

1. A ceiling construction comprising a frame built of longitudinal girders and cross girders connected to said longitudinal girders, comprising tiles suspended in fields defined by the frames, and comprising heat-exchanger elements arranged above the tiles, wherein the heat-exchanger elements are mounted on the tiles by means of a magnetic force.

2. The ceiling construction according to claim 1, wherein the tiles are manufactured of a thin sheet-metal material.

3. The ceiling construction according to claim 2, wherein the tiles are perforated.

4. The ceiling construction according to claim 2, wherein the visible side of the tile has a porous thin coating.

5. The ceiling construction according to calim 1, wherein the heat-exchanger element includes a pipe and a profiled rail supported on the lower area of said pipe, which profiled rail has a substantially flat bottom surface.

6. The ceiling construction according to claim 5, wherein holding magnets are arranged on the lower area of the profiled rail.

7. The ceiling construction according to claim 5, wherein the profiled rail has lateral flanges which are set back with respect to the bottom surface and on which the holding magnets are arranged.

8. The ceiling construction according to claim 5, wherein the profiled rail has a substantially U-shaped cross section and has a partially cylindrical area to receive the pipe.

9. The ceiling construction according to claim 5, wherein the holding magnets are each designed like a strip.

10. The ceiling construction according to claim 8, wherein the profiled rail has thickened areas at the free ends of the legs of the U-profile, which thickened areas can be held form-loockingly in recesses of the cross girders.

11. The ceiling construction according to claim 10, wherein the cross girder includes at least one racklike support rail arranged parallel to said cross girder.

12. The ceiling construction according to claim 11, wherein the support rail is held on the longitudinal girders by means of spring bars.

13. The ceiling construction according to claim 8, wherein the profiled rail is supported on the cross girders by means of mounting elements which grip around the cross girders and can be anchored to the partially cylindrical area.

14. The ceiling construction according to claim 5, wherein connecting pipes are arranged above the cross girders from which the pipes of the heat-exchanger elements branch.

15. The ceiling construction according to claim 6, wherein the holding magnets are fixedly connected to the profiled rail.

* * * * *